United States Patent Office 3,351,616
Patented Nov. 7, 1967

3,351,616
BORON-CONTAINING POLYMERS
Joseph Green, Dover, and Nathan Mayes, Ironia, N.J., assignors to Thiokol Chemical Corporation, Bristol, Pa., a corporation of Delaware
No Drawing. Filed Nov. 13, 1963, Ser. No. 324,168
17 Claims. (Cl. 260—75)

This application is a continuation-in-part of our prior application Serial No. 844,821 filed October 2, 1959.

This invention relates to organoboron compounds and more particularly to a novel class of boron-containing ester condensation polymers and to methods of making such polymers.

In recent years considerable work has been done on the preparation of organoboron compounds for use in high performance fuels. Such compounds are characterized by an exceptionally high heat of combustion. Hence when they are incorporated in compatible liquid hydrocarbon fuels, such as conventional motor fuels and jet engine fuels, they substantially improve the performance of such fuels. Also such compounds can be used with advantage in or as either liquid or solid rocket fuels.

For certain of the applications in which such organoboron compounds are used, it is desirable to have relatively high molecular weight materials. For example, in the formulation of solid rocket propellants, it is customary to mix a finely divided inorganic oxidizer with a liquid polymeric fuel-binder, and cast and cure the resulting mixture to form an elastomeric matrix containing the oxidizer. If it is desired to incorporate boron in such a propellant in the form of an organoboron compound, the organoboron should desirably have casting and/or molding properties similar to those of the conventional fuel-binders.

It is accordingly an object of the invention to provide a novel class of relatively high molecular weight organoboron compounds. It is another object of the invention to provide organoboron polymers having useful casting and/or molding properties. It is still another object of the invention to provide novel methods of making organoboron polymers. Other objects of the invention will be in part obvious and in part pointed out hereafter.

Broadly the compounds of the present invention are ester-condensation polymers of polyhydric alcohols and polycarboxylic acids in which either the polyol or the polyacid or both contains a carboranyl radical. As conducive to a clearer understanding of the invention, it may be pointed out that the compounds of the invention may be considered derivatives of carborane, which is a compound of carbon, hydrogen and boron having the empirical formula $C_2H_{12}B_{10}$. Carborane is a solid material melting at 287°–288° C. It is characterized by a surprisingly stable nuclear structure and two labile hydrogen atoms, one connected to each carbon atom. While there is some difference of opinion as to the molecular structure of carborane, its stability is usually attributed to a basket-shaped molecular configuration in which the ten boron atoms and two carbon atoms are arranged at the apices of an icosahedron. The following formula has been proposed

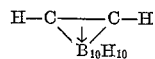

wherein the arrow indicates generalized, delocalized pi-bonding between the carbon and boron atoms. A simplified formula $H\theta H$ is customarily used wherein the Greek letter $\theta$ represents the carborane nucleus, i.e., the carboranyl radical.

In the synthesis of carborane derivatives, decaborane is customarily used as a starting material. Decaborane can be prepared by heating the lower boron hydrides, e.g., by heating diborane to 115°–120° C. for 48 hours, or by heating $B_4H_{10}$ to 90°–95° C. for five hours. The decaborane is first reacted with an electron-donor compound, e.g., acetonitrile, to form a co-ordination compound:

(1) $2CH_3CN + B_{10}H_{14} \rightarrow (CH_3CN)_2B_{10}H_{12} + H_2$

The co-ordination compound is then reacted with a compound having acetylenic unsaturation to form a carborane derivative:

(2) $(CH_3CN)_2B_{10}H_{12} + Z-C\equiv C-Z' \rightarrow$
$Z\theta Z' + 2CH_3CN + H_2$ Z and Z' can be hydrogen or any of a very wide variety of organic groups. The carboranyl polyols and polyacids used in making the present polymers are, for the most part, of the general form $Z\theta Z'$. Further details of this synthesis and an extensive list of electron-donor compounds useful therein are given in commonly-owned Fein et al. application Serial No. 269,848, filed March 28, 1963 (now U.S. Patent 3,247,256 granted April 19, 1966), as well as in our parent application Serial No. 844,821 mentioned above.

As pointed out above, the carboranyl radical or radicals of the present polymers may be in either the alcohol residue of the polyester or the acid residue of the polyester or both. We have found that in general any carboranyl glycol may be reacted with a polycarboxylic acid, which may or may not itself contain a carboranyl radical, to form the present polymers. Similarly it has been found that in general any carboranyl dicarboxylic acid may be reacted with a glycol, which may or may not contain a carboranyl radical, to form the polymers. Anhydrides and acyl chlorides of the dicarboxylic acids disclosed herein can also be used in place of the free acids in making the present polymers. Among the carboranyl glycols that are useful in preparing the polymers are HO—R—$\theta$—R—OH wherein R is an alkylene group of 1 to 4 carbon atoms and the two "R" groups may be the same or different, e.g., bis(hydroxymethyl) carborane $HO \cdot CH_2\theta CH_2 \cdot OH$;

HO—R—$\theta$—R—O—R—$\theta$—R—OH where "R" is an alkylene group defined as above, e.g., $(HO-CH_2\theta CH_2)_2O$ and $(HO-CH_2CH_2\theta CH_2)_2O$ $H\theta \cdot CH_2CH_2CH(OH)CH_2OH$ and $H\theta-COH(CH_3)CH_2OH$. Typical carboranyl acids that may be used include $H\theta \cdot CH_2CH(COOH)_2$;

HOOC·R$\theta$R—O—R$\theta$R—COOH where "R" is defined as above, e.g., $(HOOC-CH_2\theta CH_2)_2O$ and $(HOOC-\theta CH_2)_2O$.

The carboranyl glycols can be reacted with dicarboxylic acids containing no carboranyl radical to produce polyester polymers according to the invention. Such acids include maleic, fumaric, adipic, sebacic, succinic, azelaic, glutaric, phthalic, terephthalic, tetrahydrophthalic, tetrachlorophthalic and perfluoroglutaric acids. Anhydrides, acyl chlorides and esters of such acids may also be used, such as phthalic anhydride, methyl succinic anhydride, succinyl chloride, adipyl chloride and succinic acid esters. Aliphatic acids having from 3 to 10 carbon atoms are preferred.

In a similar manner the carboranyl dicarboxylic acids may be reacted with glycols, particularly alkylene glycols such as ethylene, propylene and butylene glycols, or diglycols to form condensation polymers according to the invention. Also carboranyl glycols such as those disclosed above can be condensed with the carboranyl acids such as those disclosed above to form condensation polymers having an especially high boron content.

Since certain of the compounds mentioned above are not readily available, illustrative methods by which they can be made will now be indicated.

(A) Bis(hydroxymethyl carborane (HOCH$_2$)$_3\theta$

The co-ordination compounds of equation (1) above, namely, bis(acetonitrilo) decaborane, is obtained by refluxing 10 moles of acetonitrile with one mole of decarborane for ten minutes. After cooling, white crystals of bis(acetonitrilo) decaborane are filtered therefrom.

5.9 grams (0.035 mole) of diacetoxybutyne-2 are condensed with 5.9 grams (0.029 mole) of bis(acetonitrilo) decaborane by refluxing in 50 ml. of toluene. After removing the solvent under reduced pressure, 8 grams of an orange oil containing bis(acetoxymethyl) carborane (a white solid when pure) are obtained. The impurities present in the oil are hydrolyzed by heating in a 5% sodium ethoxide solution for 15 minutes, followed by a neutralization with hydrochloric acid. Bis(acetoxymethyl carborane is separated from the aqueous components.

4 grams of the bis(acetoxymethyl) carborane are dissolved in 25 ml. of methanol and refluxed one hour with 15 ml. of 25% aqueous sodium hydroxide. The ethereal solution is washed with water, dried, and concentrated under vacuum, leaving a white solid, bis(hydroxymethyl) carborane.

The bis(acetoxymethyl) carborane can also be hydrolyzed with acid, e.g., using aqueous methanolic hydrogen chloride. The infra-red spectra of the materials obtained are almost identical, although the material obtained by acid hydrolysis is somewhat less pure. When recrystallized from water containing a little methanol, the materials have a hydroxy value of 16% compared with a calculated value of 16.4%.

(B) Bis(hydroxymethylcarboranylmethyl) ether
(HO·CH$_2\theta$CH$_2$)$_2$O

The co-ordination compound of decaborane and acetonitrile is reacted with dipropargyl ether to produce a dicarboranyl methyl ether. Details of this reaction are given in commonly-owned Fein et al. application Ser. No. 269,848, filed March 28, 1963 (now U.S. Patent 2,247,256 granted April 19, 1966).

The dicarboranyl methyl ether is then reacted with a lithium alkyl such as butyl lithium to form (Li$\theta$CH$_2$)$_2$O and the lithiated ether is reacted with formaldehyde to form (LiOCH$_2\theta$CH$_2$)$_2$O. Hydrolysis of the latter product with aqueous HCl yields the desired glycol ether (HOCH$_2\theta$CH$_2$)$_2$O. Details of this synthesis are given in commonly-owned Dvorak et al. application Ser. No. 269,837, filed March 28, 1963 (now U.S. Patent 3,247,255 granted April 19, 1966).

(C) Bis(hydroxyethylcarboranylmethyl) ether
(HOCH$_2$)CH$_2\theta$CH$_2$)$_2$O

The procedure under B above is used except that the lithiated ether is reacted with ethylene oxide instead of formaldehyde to yield (LiOCH$_2$CH$_2\theta$CH$_2$)$_2$O. Hydrolysis with aqueous HCl yields the glycol ether (HO·CH$_2$CH$_2\theta$CH$_2$)$_2$O Details of this synthesis are given in commonly-owned Grafstein et al. application Ser. No. 269,838, filed March 28, 1963.

(D) Bis(carboxy carboranyl methyl)ether
(HOOC—$\theta$CH$_2$)$_2$O

The procedure under B above is followed except that the lithiated ether is reacted with carbon dioxide instead of formaldehyde to yield (LiOOCH—$\theta$CH$_2$)$_2$O which on hydrolysis gives the ether acid (HOOC·$\theta$CH$_2$)$_2$O. Details of these reactions are given in commonly-owned Dvorak et al. application Ser. No. 269,837, filed March 28, 1963 (now U.S. Patent 3,247,255 granted April 19, 1966).

(E) Bis(carboxymethylcarboranylmethyl ether
(HOOC—CH$_2\theta$CH$_2$)$_2$O

The glycol ether (HOCH$_2$CH$_2\theta$CH$_2$)$_2$O produced as in (C) above can be oxidized with dichromate solution to yield this ether acid. Details are given in commonly-owned Grafstein et al. application Ser. No. 269,838 referred to above.

(F) 1,2-dihydroxy-2-methyl-ethylcarborane
H$\theta$—COH(CH$_3$)CH$_2$OH

The co-ordination compound of decarborane and acetonitrile is reacted with isopropenyl acetylene to give isopropenyl carborane, which is then reacted with perfluoroperacetic acid to yield an epoxy carborane

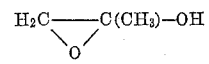

Treatment of the epoxy carborane with aqueous sulfuric acid gives H$\theta$—COH(CH$_3$)CH$_2$OH. Further details are given in commonly-owned Bobinski et al. application Ser. No. 59,460, filed September 29, 1960.

(G) 1,2-hydroxy-butylcarborane
H$\theta$CH$_2$CH$_2$CHOHCH$_2$OH 1-butenyl carborane is reacted with trifluoroacetic acid in the presence of methylene chloride to form an ester H$\theta$CH$_2$CH$_2$·CHOH·CH$_2$OOC·CF$_3$ which is hydrolyzed to form H$\theta$CH$_2$CH$_2$CHOH·CH$_2$OH. Details are given in commonly-owned Grafstein et al. application Ser. No. 290,904, filed June 27, 1963.

(H) 1,1-dicarboxy-ethylcarborane
H$\theta$CH$_2$—CH(COOH)$_2$

Sodium dimethyl malonate is reacted with propargyl bromide to produce propargyl dimethyl malonate (dimethyl ester of 2-propagyl propane-1,3-dioic acid). This product is then reacted with bis(acetonitrilo) decaborane to yield the dimethyl ester of carboranylmethyl malonic acid H$\theta$CH$_2$—CH(COOCH$_3$)$_2$. The free acid is obtained by saponification and acidification. Details are given in commonly-owned Bobinski et al. application Ser. No. 844,818, filed October 2, 1959.

Polymerization of the boron-containing diols and diacids can be carried out by techniques conventional in the art for diol-diacid condensations, e.g., heating at reflux temperature to drive off water for a period sufficient to form a condensation polymer. The condensation can be catalyzed by acid catalysts known to the art, e.g., p-toluene sulfonic acid and Lewis acid type catalyst such as zinc chloride and aluminum chloride. Or, the reaction may be uncatalyzed and proceed by simple heating or by bubbling an inert gas, such as nitrogen or argon, through the reactants. The reaction proceeds in solvent or in bulk. Condensation polymers having molecular weights within the range 500 to 5000 or higher are readily obtained.

In some cases, as for example where both carboxyl groups of the diacid are attached to the same carbon atom, polymerization of the diol and diacid is desirably effected by ester interchange in known manner.

In order to point out more fully the nature of the invention, the following specific examples are given of illustrative polyester polymers according to the invention and methods of preparing such polymers.

*Example 1*

1.65 grams (0.008 mole) of bis(hydroxymethyl) carborane were mixed with 1.09 grams (0.007 mole) of succinyl chloride and allowed to react in an open vessel. The mixture was heated at 105° C. for 16 hours and at 130°–135° C./1 mm. Hg for 4 hours. The product was a clear, amber-colored solid which had a softening point at about 50° C. and was fluid above 100° C. It was soluble in benzene and had an average molecular weight of 1900.

Further reactions in which the ratio of the reactants was varied gave the following results:

| Acid Reactant | Molar Ratio Acid:Diol | Mole Wt. | Softening Point, ° C. | Flow Point, ° C. |
|---|---|---|---|---|
| Succinyl chloride | 7:8 | 1,900 | 50 | 100–120 |
| Do | 5:6 | 1,520 | 50 | 100–120 |
| Do | 3:4 | 1,333 | 50 | 100–120 |

Example 2

4.13 grams (0.020 mole) of bis(hydroxymethyl) carborane and 2.75 grams (0.015 mole) of adipylchloride were refluxed in 30 ml. of benzene for 23 hours. Hydrogen chloride was evolved. The benzene was removed by evaporation on a steam bath and its final traces removed by placing the product in a vacuum oven at a temperature of 100° C. The product was a solid having an average molecular weight of 1750.

Example 3

3.50 grams (0.017 mole) of bis(hydroxymethyl) carborane, 3.50 grams (0.016 mole) of adipic acid and 0.05 gram of zinc chloride were heated in bulk under an argon atmosphere at 200° C. for 18 hours. The product upon cooling was dissolved in benzene and filtered to remove a small amount of insoluble material. The benzene was removed by evaporation. The last traces of benzene were removed by placing the material in a vacuum oven at 100 °C. The product was a clear, amber-colored solid with an average molecular weight of 4440.

Example 4

3.10 grams (0.015 mole) of bis(hydroxymethyl) carborane and 2.29 grams (0.0125 mole) of adipyl chloride were mixed and allowed to react first at room temperature. Thereafter the mixture was heated for 16 hours at 100–140° C. and then for 4 hours at 120° C./2 mm. Hg. The product was a sticky solid having a cryoscopically determined molecular weight of 2900 with a flow point range of 50°–70° C.

Example 5

5.15 grams (0.025 mole) of bis(hydroxymethyl) carborane, 3.30 grams (0.025 mole) of glutaric acid and 0.1 gram of zinc chloride (catalyst) were heated at 130°–140° C. for 24 hours. Nitrogen was bubbled through for agitation. The system was thereafter heated at 130° C./2 mm. Hg for 20 hours. The cooled product was dissolved in benzene and the insoluble material removed by filtration. Upon removal of benzene the product was a soft, clear, amber solid having a molecular weight of about 3600, as determined by titration of unreacted carboxyl groups.

Example 6

10.11 grams (0.05 mole) of sebacic acid, 23.44 grams (0.06 mole) of $(HO \cdot CH_2 \theta CH_2)_2 O$ and 25 ml. of xylene were combined in a 100 ml. resin flask having a stirrer and nitrogen bubbler, and fitted with a Dean-Stark receiver. The flask was heated in an oil bath at 200° C. for four days. An amber-colored brittle solid soluble in benzene and having a molecular weight of 2650 (by titration) was obtained.

Example 7

10.11 grams (0.05 mole) of sebacic acid, 7.31 grams (0.05 mole) of adipic acid, and 22.98 grams (0.1125 mole) of bis(hydroxymethyl) carborane were combined with about 25 ml. of xylene in a 100 ml. resin flask equipped with a stirrer and bubbler. The mixture was heated at 190°–195° C. for about 6 days. A polymer having an acid number of 9.5 (M.W.=1978) was obtained.

Example 8

6.64 grams (0.056 mole) of succinic acid, 10.59 grams (0.056 mole) of azelaic acid, and 25.54 grams (0.125 mole) of bis(hydroxymethyl) carborane were combined with 25 ml. of xylene in a 100 ml. resin flask having a stirrer and bubbler and heated for about 7 days at 195° C. A polymer having an acid number of 3.82 (M.W.=2534) was produced.

Example 9

49.03 grams (0.050 mole) of maleic acid and 102.17 grams (0.50 mole) of bis(hydroxymethyl) carborane were combined with 30 ml. of xylene in a 250 ml. resin flask having a stirrer and nitrogen bubbler. The flask was heated in an oil bath at 190° C. for about 4 days in the presence of a small amount of hydroquinone to inhibit side reactions of the maleic acid. A brittle clear amber solid was obtained.

Example 10

55.39 grams (0.20 mole) of perfluoroglutaric acid chloride and 40.86 grams (0.20 mole) of bis(hydroxymethyl) carborane were combined with 20 ml. of xylene in a 200 ml. resin flask equipped with a stirrer, condenser, and nitrogen inlet. The mixture was heated for 24 hours at 100° C., then for 24 hours at 130° C. and then refluxed at about 160° C. for 7 days. A tough plastic material having an M.W. of 7900 (by titration) was recovered.

Example 11

A 25 ml. flask equipped with a stirrer and argon bubbler was charged with 2.23 grams (0.005 mole) of a carboxyl-terminated dicarboranyl ether

2.09 grams (0.005 mole) of a hydroxyl-terminated dicarboranyl ether $(HOCH_2 \cdot CH_2 \theta CH_2)_2 O$, and 0.02 grams of p-toluene sulfonic acid as a catalyst. The reaction mixture was heated at 190° C. and became a homogeneous fluid in about one hour. Heating was continued for 3 days to form a solid polymer. The product was a brittle, colorless solid having an initial melting point of 192° C. Its molecular weight was 3256 as determined by boiling point elevation in benzene.

Example 12

A 500 ml. flask was charged with 20.03 grams (0.1 mole) of terephthalyl chloride, 20.43 grams (0.1 mole) bis(hydroxymethyl) carborane, and 73 grams of o-terphenyl as a solvent. The reaction mixture was heated under a nitrogen atmosphere in the range 150°–275° C. for four days. The resulting mixture was washed with hot benzene to leave a solid polymeric product having an initial softening temperature of 285° C. I.R. analysis of the product showed it to be an ester. The product was soluble in hot o-cresol. On heating to 330°–350° C. it become rubbery.

Example 13

A flask was charged with 4.86 grams (0.02 mole) of 4 nitraza-1,7-heptanedioyl chloride

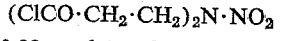

4.08 grams (0.02 mole) of bis(hydroxymethyl) carborane, and 12 ml. of benzene. Dry nitrogen was passed through the mixture, and it was heated at 55° C. for three days. The resulting polymeric product had a molecular weight of 1025 as determined by boiling point elevation in benzene. I.R. analysis indicated an ester structure.

Example 14

An ester polymer of ethylene glycol and (carboranylmethyl) methylmalonic acid was prepared as follows.

3.9 grams (0.013 mole) of the diethyl ester of (carboranylmethyl) methylmalonic acid, 2.4 grams (0.039 mole) of ethylene glycol, 0.006 gram of CaH₂, and 0.006 gram of PbO were heated together under argon for 22 hours at a temperature of 140–165° C. Thereafter volatile materials were removed by heating at 240° C./1 mm. Hg for 1.5 hours. The residue was dissolved in benzene and filtered. Evaporation of the benzene from the filtrate left a brownish-green solid, which had a cryoscopically determined molecular weight of 618.

*Example 15*

The polyester condensation polymer of 1,4-butanediol with the same acid mentioned above in Example 14 was prepared as follows.

6.36 grams (0.02 mole) of the diethyl ester of (carboranylmethyl) malonic acid, 5.04 grams (0.06 mole) of 1,4-butanediol, and 0.05 gram of p-toluene sulfonic acid were heated together in a 3-necked, round-bottom glass flask with water cooled condensers attached to 2 of the 3 necks. A nitrogen supply was connected to the third to provide agitation of the reactant mixture. The nitrogen-agitated mixture was heated at temperatures ranging from 90–140° C. for 2 hours, during which time 3.8 ml. of ethanol were removed. Thereafter the mixture was heated for 5 hours at 150° C./15 mm. Hg and then for 16 hours at 210° C./1 mm. Hg. The residue was cooled, dissolved in benzene and filtered. The evaporated filtrate yielded a dark colored, tough solid which had a cryoscopically determined molecular weight of 603.

*Example 16*

The polyester condensation polymer of 1,3-propanediol and the acid mentioned in Examples 14 and 15 above was prepared as follows.

With the apparatus of Example 15, 5.0 grams (0.0157 mole) of the diethyl ester of the decaborane substituted acid mentioned in Examples 14 and 15, 3.58 grams (0.0471 mole) of 1,3-propanediol and a mixed catalyst of 0.3 gram of lead monoxide and 0.03 gram of p-toluene sulfonic acid were heated at from 95° to 130° C./5 mm. Hg for 3.5 hours, during which time ethanol was evolved and collected. The mixture was thereafter heated for 4.5 hours at 160° C./5 mm. Hg. The resulting polymer had a molecular weight of 707.

*Example 17*

The polyester condensation polymers of (carboranylmethyl) methylmalonic acid with 1,6-hexanediol, 1,9-nonanediol and 1,10-decanediol were separately prepared as follows.

With the apparatus as described in Example 15, 6.64 grams (0.020 mole) of the diethyl ester of the boron-containing acid mentioned above, 2.36 grams (0.020 mole) of 1,6-hexanediol and four drops of butyl titanate were heated for 44 hours at 135–140° C. as dry nitrogen was bubbled through the mixture. The mixture was heated further at 160° C. under a reduced pressure of 1 mm. of Hg for 24 hours. Heating continued for 6.5 hours at 160° C. at a reduced pressure of 10 mm. of Hg, while agitating with a stream of dry nitrogen. The resulting polymer was a light-amber colored solid having an average molecular weight of 2090.

The 1,6-hexanediol was replaced with 0.20 moles of 1,9-nonanediol and 0.20 mole of 1,10-decanediol, respectively, in two additional runs, under conditions otherwise identical with those above, to produce the respective condensation polymers, which had average molecular weights of 1710 and 1611, respectviely.

It may be noted that the carboranyl diols and diacids used in preparing the present polymers may be derivativesof carborane isomers as well as of carbonane itself. When carborane is heated at 400°–500° C. under autogeneous pressure, it is converted into an isomer known as neocarborane, which is similar to carborane in its properties and reactions. Information concerning the properties, reactions and derivatives of neocarborane are given in commonly-owned Grafstein et al. application Serial No. 97,098, filed March 20, 1961 (now U.S. Patent 3,226,429 granted December 28, 1965). In general the neocarboranyl diols and diacids can be used in place of or in combination with the carboranyl diols and diacids mentioned above to produce boron-containing polyester polymers according to the invention.

It is of course to be understood that the foregoing examples are intended to be illustrative only and that numerous changes can be made in the ingredients, proportions and conditions specifically disclosed therein without departing from the spirit of the invention as defined in the appended claims.

What is claimed is:

1. A boron-containing polyester condensation polymer of a glycol and a dicarboxylic acid, at least one of said glycol and said dicarboxylic acid being selected from the group consisting of carboranyl glycols and carboranyl dicarboxylic acids.

2. A boron-containing polyester condensation polymer according to claim 1 wherein only said glycol contains boron.

3. A boron-containing polyester condensation polymer of a carboranyl glycol and a carboranyl dicarboxylic acid.

4. A boron-containing polyester condensation polymer of a carboranyl glycol and an aliphatic dicarboxylic acid having three to ten carbon atoms.

5. A boron-containing polyester condensation polymer of bis(hydroxymethyl) carborane and an aliphatic dicarboxylic acid having three to ten carbon atoms.

6. A polyester according to claim 5 wherein said acid is succinic acid.

7. A polyester according to claim 5 wherein said acid is adipic acid.

8. A polyester according to claim 5 wherein said acid is glutaric acid.

9. A polyester according to claim 5 wherein said acid is sebacic acid.

10. A polyester according to claim 5 wherein said acid is maleic acid.

11. A boron-containing polyester condensation polymer of a bis(hydroxy-lower alkyl-carboranylmethyl) ether and an aliphatic dicarboxylic acid having three to ten carbon atoms.

12. A polyester according to claim 11 wherein said ether is bis(hydroxymethyl-carboranylmethyl) ether.

13. A polyester according to claim 11 wherein said ether is bis(hydroxyethyl-carboranylmethyl) ether.

14. A boron-containing polyester condensation polymer according to claim 1 wherein said glycol is $$(HOR-C_2B_{10}H_{10}-R)_2O$$

and said dicarboxylic acid is $$(HOOC-R-C_2B_{10}H_{10}-R)_2O$$

wherein —$C_2B_{10}H_{10}$— is the carboranyl group and R is an alkylene radical having one to four carbon atoms.

15. A method of making a boron-containing polyester condensation polymer which comprises condensing a glycol and a dicarboxylic acid at an elevated temperature, at least one of said glycol and said dicarboxylic acid being selected from the group consisting of carboranyl glycols and carboranyl dicarboxylic acids.

16. A method of making a boron-containing polyester condensation polymer which comprises condensing a bis-(hydroxylower alkyl) carborane with an aliphatic dicarboxylic acid having three to ten carbon atoms at an elevated temperature.

17. A method of making a boron-containing polyester condensation polymer which comprises reacting a coordination compound of decaborane and acetonitrile with an ester of 2-butyne-diol-1,4, hydrolyzing the resultant product to recover bis(hydroxymethyl) carborane, and condensing said bis(hydroxymethyl) carborane with an aliphatic dicarboxylic acid at an elevated temperature to form said polymer.

References Cited
UNITED STATES PATENTS

| | | | |
|---|---|---|---|
| 1,864,909 | 6/1932 | Jaeger | 260—75 |
| 1,897,977 | 2/1933 | Ellis | 260—75 |
| 2,901,466 | 8/1959 | Kibler et al. | 260—75 |
| 3,166,597 | 1/1965 | Ager et al. | 260—606.5 |
| 3,203,979 | 8/1965 | Ager et al. | 260—488 |

OTHER REFERENCES

Ellis: The Chemistry of Synthetic Resins, vol. II, pp. 862–870 published 1935 Reinhold Publishing Corps., New York, N.Y.

Fieser and Fieser: Advanced Organic Chemistry, Reinhold Publishing Co., New York, 1962, pp. 374 to 376.

WILLIAM H. SHORT, *Primary Examiner.*

REUBEN EPSTEIN, CARL D. QUARFORTH,
*Examiner.*

L. A. SEBASTIAN, L. P. QUAST, *Assistant Examiners.*